UNITED STATES PATENT OFFICE.

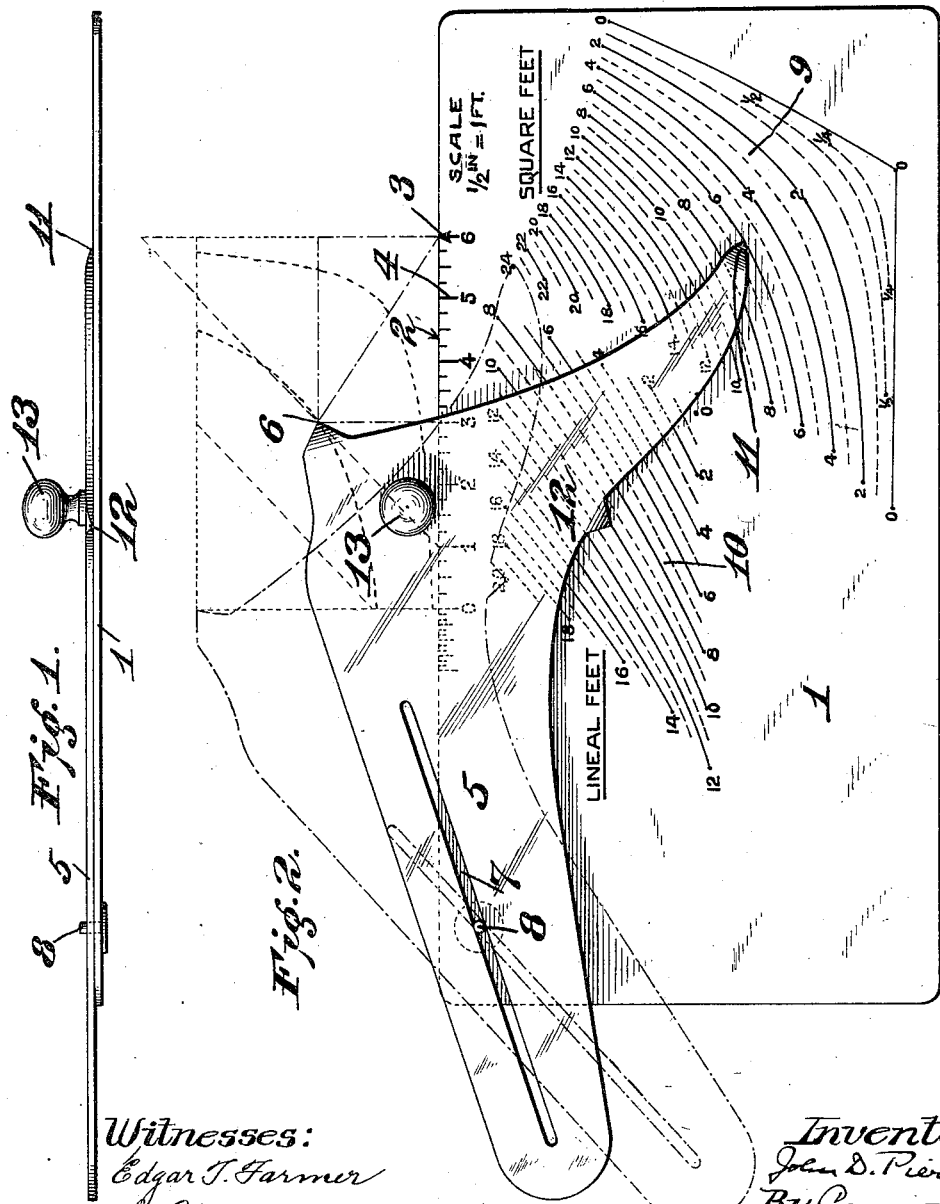

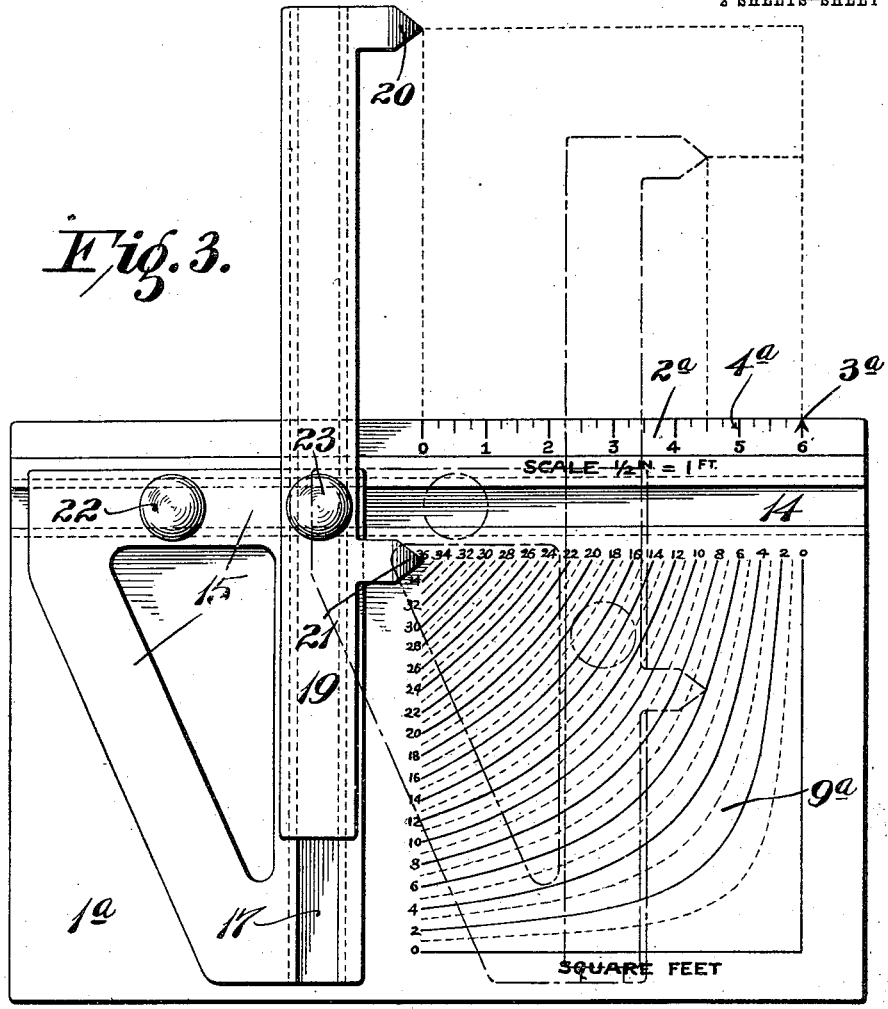

JOHN D. PIERCE, OF ST. LOUIS, MISSOURI.

MEASURING AND CALCULATING INSTRUMENT.

990,385.

Specification of Letters Patent. Patented Apr. 25, 1911.

Application filed August 14, 1909. Serial No. 512,781.

*To all whom it may concern:*

Be it known that I, JOHN D. PIERCE, a citizen of the United States, and a resident of the city of St. Louis, State of Missouri, have invented a new and useful Improvement in Measuring and Calculating Instruments, of which the following is a specification.

This invention relates to measuring and calculating instruments.

It has for its principal object to produce a simple and easily manipulated instrument to be applied to plane figures or surfaces of some regular shape but of varying sizes to give the lineal dimensions or the area thereof; or, to indicate certain calculations which have a fixed relation to or are based upon such lineal dimensions or areas; or, to indicate the cubical contents behind plane surfaces when the thickness is a predetermined constant; or, to indicate certain calculations which have a fixed relation to or are based upon such cubical contents.

The invention consists in an instrument comprising a member adapted to be applied to one side of the figure or surface to be measured, and a member movable with respect to said first mentioned member and having a locating point arranged to be applied at a predetermined point on the figure or surface being measured, and also having an indicating point or plurality of points in fixed relation to said locating point and arranged to indicate a correlated point or line which is inscribed on the first mentioned member and marked with predetermined numbers or characters giving the lineal dimensions, area, cubical contents or certain calculations having a fixed relation to or based upon such measurements.

The invention further consists in the parts and in the arrangements and combinations of parts hereinafter described and claimed.

In the accompanying drawings, which form part of this specification, and wherein like symbols refer to like parts wherever they occur, Figure 1 is an edge view of an instrument embodying my invention; Fig. 2 is a top plan view of the instrument, the same being arranged to give the lineal boundary dimensions and area in feet, of rectangular figures or surfaces which are drawn or made on a miniature scale. Fig. 3 is a top plan view of a modified form of the device; and Figs. 4 and 5 are bottom and right-hand edge views, respectively, of the device shown in Fig. 3.

It is to be understood that each instrument embodying my invention is to be individually adapted to indicate the measurements, or calculations based thereon, of figures or surfaces which are drawn or made on some fixed scale, either full size or some proportional scale. The particular instrument illustrated in the drawing is designed to indicate in feet the area of and the lineal distance around rectangular figures or surfaces which are drawn or made on a miniature scale. As represented in the drawings, the scale is presumed, for example, to be one-half inch to the foot; and the scope of the instrument includes any rectangular area within the maximum limits of an oblong area of four by six units which represent one foot each.

The instrument comprises a thin rectangular plate or base member 1 of sheet metal, cardboard, celluloid or any other suitable material of the requisite strength and durability. One edge 2 of the plate 1 is adapted to be applied to one side of the figure or surface to be measured and it has a locating point 3 marked or indicated on the adjacent marginal portion. To properly position the instrument, this point 3 is made to register with the corner of the angle or point of intersection of one of the sides which is perpendicular to the side of the figure against which the edge 2 of the plate 1 is applied.

As shown in the drawing, the marginal portion of the plate 1 is marked with a graduated lineal measure or scale 4 corresponding to the scale for which the instrument is adapted and said mark 3 is preferably located at one end of the measure. However, the measure or scale 4 may be dispensed with as the same has no direct function in the operation or use of the instrument. So, too, a rightangled shoulder or other device may obviously be formed or provided on the edge 2 of the plate 1 in lieu of the mark 3 to facilitate the positioning of the instrument with respect to the rectangle to be measured.

A movable member 5 is mounted on the plate or member 1. This movable member is provided with a locating point 6 adapted to be applied to the corner of the rectangle diagonally opposite the corner thereof to which the locating mark 3 on the plate 1 is applied. The member 5 is provided with a straight elongated slot 7 which is in line with the point 6, and said slot slidably and pivotally fits a stud or rivet 8 which is secured to the plate or member 1 near one corner thereof. By this arrangement, the member 5 is permitted a sliding and rotatory movement, so that the locating point 6 may be universally moved and applied to a predetermined point on any rectangle within the confines of the maximum scope of the instrument.

On the plate or member 1 are inscribed two separate scales or graduated plats 9, 10, which are respectively marked to designate areas and lineal boundary dimensions of rectangles. The scale or plat 9 comprises a series of distorted curved lines each of which is traced by a fixed indicating point 11 on the movable member 5 when the locating point 6 on said member describes an equilateral hyperbola; that is, one in which the asymptotes are perpendicular to each other. In the instrument illustrated in the drawings, the edge 2 of the member 1 and an imaginary line perpendicular to said edge 2 at the locating point 3 constitute the asymptotes. Therefore, the area of any rectangle which is placed with one side against the edge 2 of the member 1 and with one of its perpendicular sides in the plane of the imaginary asymptote which extends perpendicularly from the point 3, and having its corner which is diagonally opposite the corner at the point 3 touching the hyperbola described by the point 6 on the member 5, will be the same as any other rectangle so located and touching with its corner at any point on the hyperbola; and by placing the point 6 of the movable member on said corner of the rectangle which is being measured the area will be indicated on the correlated line of the scale 9.

The scale 10 comprises a series of curved lines each of which is traced by a fixed indicating point 12 on the member 5 when the locating point 6 on said member describes a straight line forming the hypotenuse of a rightangled triangle whose perpendicular sides are of equal length, said perpendicular sides lying respectively in the plane of the edge 2 of the member 1 and a line perpendicular to said edge 2 at the point 3 and corresponding to the asymptotes of the hyperbolas hereinbefore described. The lineal boundary dimensions of any rectangle having two sides located in the same manner as the rectangle which is to be measured to compute the area, but having its diagonal corner touching the hypotenuse described by the point 6 on the member 5, will be equal to the lineal boundary dimensions of any other rectangle so located and touching with its corner at any point on said hypotenuse.

While the instrument shown in the drawing is adapted and marked to indicate the lineal distances around and the areas of rectangles, it is obvious that the same arrangement of the device can be adapted for measuring and calculating the areas of rightangled triangles. The area of a rightangled triangle being just one-half of the area of a rectangle whose opposite sides are equal to the perpendicular sides of the triangle, it is only necessary to divide the predetermined calculation by 2 if the instrument is used to measure a rightangled triangle and it is marked to indicate calculations based upon the areas of rectangles. On the other hand, if the instrument is marked to indicate calculations based upon the areas of rightangled triangles and it is used to measure a rectangle, it is only necessary to multiply the indicated calculation by 2. In cases of lineal dimensions of triangles, however, separate and distinct calculations must be predetermined and marked upon the indicating scale; and the lines of said scale must be specially described and correlated with respect to the lines described by the locating point 6 of the member 5 and each of which passes through predetermined points of triangles of one regular shape, having the same lineal boundary dimensions and being located from a common point on the member 1.

In measuring a right-angled triangle the base is placed against the edge 2 of the member 1 and the corner of the angle at the point of intersection of the base and hypotenuse is placed at the locating point 3. Then the locating point 6 on the member 5 is applied to the corner of the angle at the point of intersection of the perpendicular side and hypotenuse.

The exact arrangement of instrument which is adapted to indicate the areas of rectangles is applicable to equilateral and isosceles triangles. By placing the edge 2 of the member 1 to the base of the triangles and having one corner of the triangle located at the point 3 and then applying the locating point 6 of the member 5 to the apex of the triangle, the indicating point 11 on said member 5 will touch the line on the scale 9 which gives the area of the triangle and which is equal to the area of a rectangle located and measured as hereinbefore set forth.

The instrument illustrated in the drawings may be used to facilitate the making of estimates of cost based upon lineal boundary measurements and areas. For example, the area of the wire fabric and the length of the material required for the frame of a window screen may be readily indicated from an architectural drawing and other similar calculations may obviously be made with the aid of the instrument. Instead of indicating the predetermined lineal measurements or areas on the respective lines of the scales 9, 10, calculations of costs based on such lineal measurements or areas may obviously be indicated, or the lineal measurements and areas together with the calculations based thereon may be indicated. So, too, the cubical contents behind a rectangular area may be indicated by the instrument, when the thickness is a predetermined constant, by having such calculations designated on the lines of the scale 9.

The movable member 5 may be provided with a knob 13 or any other suitable device for conveniently manipulating the same, and the shape of said member may be varied; and the locations of the locating and indicating points thereon may also be varied with respect to the pivot point of the member to adapt the devices to various scales and dimensions. It is also obvious that instead of providing for an eccentric sliding and rotatory movement to the member 5 whereby the indicating point on said member traces a distorted curved line, said member 5 may be mounted and arranged on the member 1 to travel in two cross directions parallel with each of the perpendicular asymptotes of the hyperbola described by its locating point, whereby its indicating point will trace a correlated line on the member 1 corresponding exactly to the shape of the hyperbola; that is, a slide or device may be mounted on the member 1 so as to be reciprocated parallel with the edge 2 thereof and have a member corresponding to the member 5 mounted thereon to be reciprocated perpendicularly to the edge 2 of the member 1.

A device embodying the above mentioned modification is illustrated in Figs. 3 to 5, inclusive. This device comprises a base plate 1ª which has a beveled edge portion 2ª. The beveled edge corresponds to the edge 2 in the hereinbefore described device and it is provided with a mark or locating point 3ª. It also has a graduated scale 4ª inscribed thereon.

Extending across the top face of the plate 1ª parallel with the edge 2ª is a groove 14 having undercut sides. A plate or frame 15 is slidably mounted flatwise on the base plate 1ª. It is provided on its under face with a rib 16 which is a counterpart of the groove 14 on the plate 1ª and in which it is slidably fitted. The frame 15 has a groove 17 in its top face which extends transversely with respect to the rib 16 on its under face. This groove 17 has undercut sides similar to the groove 14, and it has slidably fitted therein a counterpart rib 18 on the under face of a flat bar or strip 19.

On the end of the bar 19 is a pointer 20 which is arranged so that it may be made to coincide with a predetermined point or corner of a plane figure or surface to be measured by shifting the bar 19 with respect to the frame 15 and the frame with respect to the base plate. A second pointer 21 is provided on the bar 19 and arranged so as to indicate the line of a scale 9ª on the base 1ª which is correlated to the locus of predetermined common points of a multiplicity of plane figures or surfaces of some regular shape and different proportions but of equal magnitude and located from a common point which coincides with the point 3ª at the edge of the base plate 1ª.

For convenience in manipulating the device knobs 22, 23 are provided, respectively, on the frame 15 and the bar 19. However, a single knob provided on the bar 19 only will be sufficient for manipulating the frame and bar owing to their coöperative arrangement.

To avoid confusion in reading the scales or plats 9, 10, the lines are alternately made solid and broken. The solid lines indicate calculations in even numbers and are so marked, while the broken lines indicate calculations in odd numbers which are omitted. In determining the calculation when the indicator point of the member 5 of the particular instrument illustrated in the drawing does not touch one of the lines of the scale, the result is determined approximately by considering the line which is nearest to the indicating point. For example, if the point is about half way between the lines indicating respectively six and seven square feet on the scale 9, the calculation will be determined as six and one-half square feet. Or, if the point is close to any line, the calculation indicated by said line is taken as the approximate calculation of the area or lineal dimensions of the figure being measured as the case may be. It is also obvious that the device admits of considerable further modification without departing from my invention. Therefore, I do not wish to be limited to the specific construction shown and described.

What I claim is:

1. An instrument adapted to be applied to plane figures or surfaces of some regular shape but of varying sizes, to indicate the lineal dimensions or areas of said figures or surfaces, or certain calculations which have a fixed relation to or are based upon such lineal dimensions or areas, said instrument comprising a flat base member one side of which is adapted to be applied to one side of the figure to be measured, and having a common locating point, and an indicator member slidably connected with and guided on said base member so as to move in any direction on the face of the latter and having a locating point arranged to be applied at a predetermined point on the figure being measured, said indicator member also having an indicating point in fixed relation to its locating point, and said base member having a line inscribed thereon which constitutes a locus of the several positions which said indicating point on the indicator member assumes when the correlated locating point on said indicator member is made to coincide with corresponding predetermined points on plane figures or surfaces of a regular shape and different proportions but of equal magnitude and located from corresponding points which coincide with the common locating point on the base member and with one corresponding side coinciding.

2. An instrument adapted to be applied to plane figures or surfaces of some regular shape but of varying sizes, to indicate the lineal dimensions or areas of said figures or surfaces or certain calculations which have a fixed relation to or are based upon such lineal dimensions or areas, said instrument comprising a member adapted to be applied to one side of the figure to be measured and having a common locating point, and a member movable with respect to said first mentioned member and having a locating point arranged to be applied at a predetermined point on the figure being measured, said movable member being so arranged and mounted on said first mentioned member that its locating point may be made to trace a hyperbola, and said movable member also having an indicating point in fixed relation to its locating point and arranged to trace a correlated line which is inscribed on said first mentioned member and marked with predetermined numbers or characters.

3. An instrument adapted to be applied to plane figures or surfaces of some regular shape but of varying sizes, to indicate the lineal dimensions or areas of said figures or surfaces or certain calculations which have a fixed relation to or are based upon such lineal dimensions or areas, said instrument comprising a member having one edge adapted to be applied to one side of the figure to be measured and having a fixed locating point, and a member movable with respect to said first mentioned member and having a locating point arranged to be applied at a predetermined point on the figure being measured, said movable member being so arranged and mounted on said first mentioned member that its locating point is permitted a universal movement over a plane surface, said movable member also having an indicating point in fixed relation to its locating point, and said first mentioned member having a scale inscribed thereon comprising a series of curved lines each of which is traced by the indicating point on said movable member when the locating point on said member describes a predetermined equilateral hyperbola whose asymptotes lie in the plane of the locating edge of said first mentioned member and a line perpendicular to said edge at its fixed locating point.

4. An instrument adapted to be applied to plane figures or surfaces of some regular shape but of varying sizes, to indicate the lineal dimensions or areas of said figures or surfaces or certain calculations which have a fixed relation to or are based upon such lineal dimensions or areas, said instrument comprising a member having one edge adapted to be applied to one side of the figure to be measured and having a fixed locating point, and a member movable with respect to said first mentioned member and having a locating point arranged to be applied at a predetermined point on the figure being measured, said movable member being so arranged and mounted on said first mentioned member that its locating point is permitted a universal movement over a plane surface, said movable member also having an indicating point in fixed relation to its locating point, said first mentioned member having a scale inscribed thereon and comprising a series of lines which are traced by the indicating point on said movable member when the locating point on said member describes correlated lines which are also correlated to an equilateral right angle the sides of which are formed by the locating edge of said first mentioned member and a line perpendicular to said edge at its fixed locating point.

5. An instrument adapted to be applied to plane figures or surfaces of some regular shape but of varying sizes, to indicate the lineal dimensions or areas of said figures or surfaces or certain calculations based upon such lineal dimensions or areas, said instrument comprising a member adapted to be applied to one side of the figure to be measured and having a common locating point, and a member movable with respect to said first mentioned member and having a locating point arranged to be applied at a predetermined point of the figure being measured, said movable member also having an indicating point in fixed relation to said locating point thereon and arranged to indicate a line of a scale inscribed on said first mentioned member, each line of which is correlated to a line described by the locating point on said movable member and passing through the predetermined point in each of an infinite number of figures of a predetermined shape and different proportions but of equal area or lineal dimensions as the case may be.

6. An instrument adapted to be applied to plane figures or surfaces of some regular shape but of varying sizes, to indicate the lineal dimensions or areas of said figures or surfaces or certain calculations based upon such lineal dimensions or areas, said instrument comprising a member adapted to be applied to one side of the figure to be measured and having a common locating point, and a member movably mounted on said first mentioned member and having a locating point arranged to be applied at a predetermined point of the figure being measured, said movable member having an elongated slot in line with the locating point thereon and slidably and pivotally fitted over a fixedly located stud on said first mentioned member, and said movable member also having an indicating point thereon in fixed relation to said locating point thereon and adapted to coöperate with a scale on said first mentioned member, said scale comprising a series of lines which are correlated to lines described by the locating point on said movable member and passing through a predetermined point in each of an infinite number of figures of a predetermined shape and different proportions but of equal area or equal lineal dimensions as the case may be.

7. An instrument comprising a base member adapted to be applied to one side of a triangle and having a common locating point, a stationary pivot on said base member, and an indicator member having an elongated slot fitting over said pivot and provided with separated pointers, said base member having a plurality of lines each constituting a locus of the several positions which one of said pointers assumes when the other pointer is made to coincide with the outermost corners of triangles of equal magnitude located from corresponding corners coinciding with the common locating point on said base member and with one of their sides coinciding.

8. An instrument comprising a base member adapted to be applied to one side of figures of some regular shape and having a common locating point, and an indicator member slidably connected with and guided on said base member so as to move over the face of the latter in any direction and being provided with separated pointers, said base member having a plurality of lines inscribed thereon, each line constituting a locus of the several positions which one of said pointers assumes when the other pointer is made to coincide with predetermined corresponding points on plane figures or surfaces of some regular shape and different proportions but of equal magnitude and located from corresponding points coinciding with the locating point on said base member and with one of their sides coinciding.

Signed at St. Louis, Mo., August 11th, 1909.

JOHN D. PIERCE.

Witnesses:
J. B. MEGOWN,
EDGAR T. FARMER.

---

Copies of this patent may be obtained for five cents each, by addressing the "Commissioner of Patents, Washington, D. C."